C. I. BOHLIN.
BAKING OVEN.
APPLICATION FILED APR. 15, 1911.

1,012,592.

Patented Dec. 26, 1911.
2 SHEETS—SHEET 1.

WITNESSES:
John C. Sanders,
Leon Spring

INVENTOR:
Carl Ivar Bohlin
BY
ATTY.

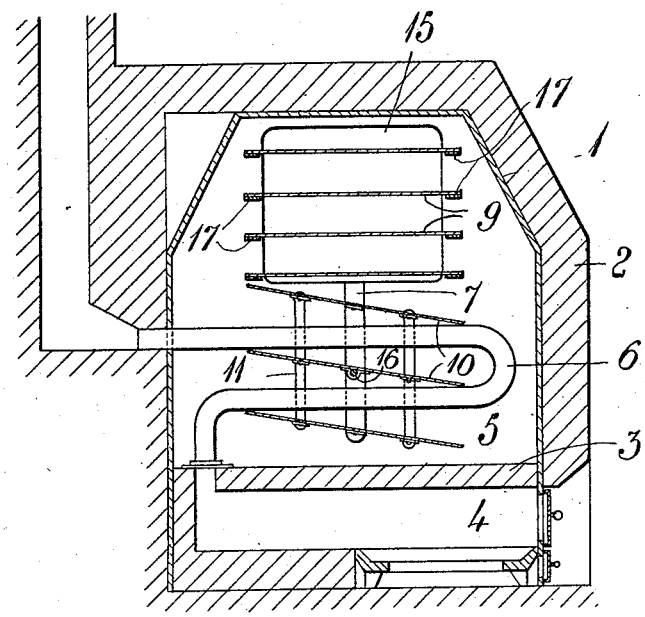

UNITED STATES PATENT OFFICE.

CARL IVAR BOHLIN, OF VESTERÅS, SWEDEN.

BAKING-OVEN.

1,012,592. Specification of Letters Patent. Patented Dec. 26, 1911.

Application filed April 15, 1911. Serial No. 621,212.

*To all whom it may concern:*

Be it known that I, CARL IVAR BOHLIN, a subject of the King of Sweden, residing at Vesterås, Sweden, have invented new and useful Improvements in Baking-Ovens, of which the following is a specification.

The object of the present invention is a baking oven which will utilize the heat in a more perfect manner than heretofore and thus be economical in a higher degree than the ovens hitherto known, and which will also effect a very even and uniform baking of the bread. At the same time, the oven is very simple in construction.

The principal characteristic feature of the invention is that the baking is accomplished by means of hot air currents, which are produced either by placing the baking plates or special guiding and protecting plates beneath the same, or both, in an inclined position, the inclination of said plates being also preferably capable of being reversed.

Figure 1:
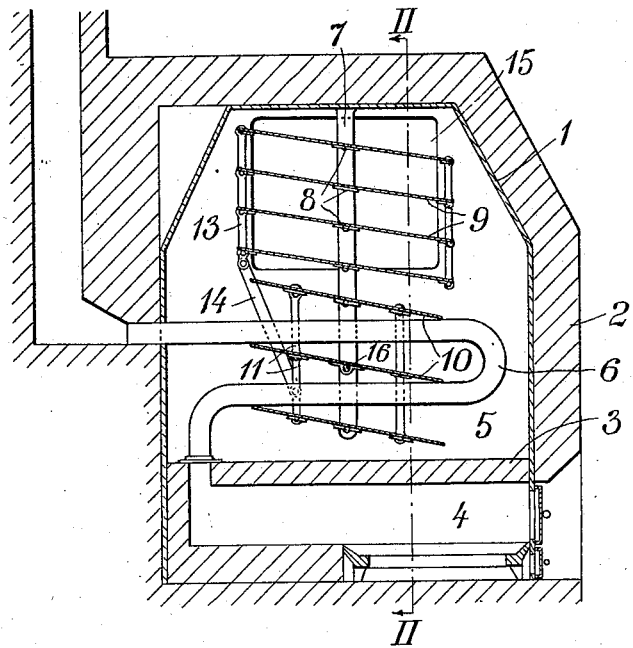
Figure 2:
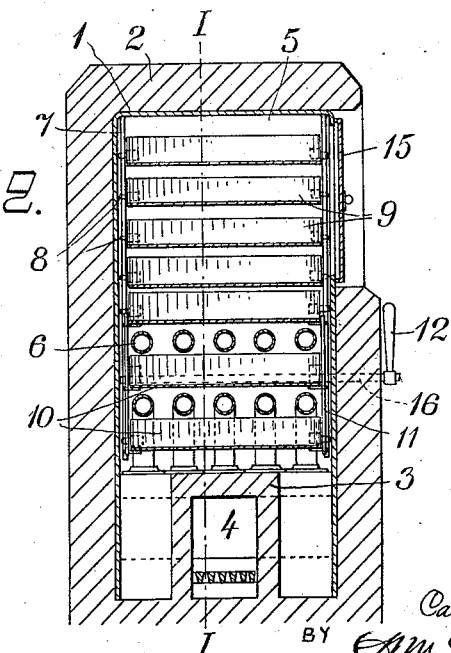

A form of the invention is illustrated in the accompanying drawing in a vertical longitudinal section (on the line I—I in Figure 2) in Fig. 1 and in a vertical cross section (on the line II—II in Fig. 1) in Fig. 2. Fig. 3 is a view similar to Fig. 1 showing a modification.

In the form shown, the casing of the oven comprises inner iron walls 1 and an outer brick-work mantle 2, but this, of course, is inessential to the invention. The oven is divided, by a horizontal partition wall 3, into a lower firing chamber 4 and an upper baking chamber 5. From the former, the combustion gases are led through a row of pipes 6 which are drawn in several windings through the chamber 5 for heating the air in the latter.

Adjacent to each of the two side walls of the baking chamber 4 there is placed a bearing piece 7 with a series of bearings for pins 8 upon which plates are capable of being tilted around a horizontal axis. The said plates are divided into two groups, viz. an upper group of baking plates 9 and a lower group of guiding and protecting plates 10. Of the latter, one is preferably placed above and one beneath the pipes 6 and also one in each interval between two windings of the said pipes. If no pipes 6 are used, but the heat communicated directly through the partition wall between the heating chamber and the baking chamber, the number of protecting plates can be reduced to one, or they can be totally omitted. If several protecting plates 10 are used they are connected together by bars or the like 11 so as to follow each other when turning on the pins 8. The said turning or tilting can be effected by means of a handle 12 outside the oven, said handle being connected to a shaft 16 substituting two of the pins 8.

The baking plates 9, which serve either to receive the bread directly or to support other plates for the bread, are also connected together by links 13 so as to follow each other when tilting around the axis of the pins 8. Finally, the upper group of plates is connected to the lower by one or more links 14, which preferably are so arranged that the lower plates will swing through a greater angle than the upper, which can be effected by making the distance between the lower ends of the links 14 and the bearing piece smaller than the corresponding distance of the upper ends of said links. Hereby the lower plates can be inclined at a comparatively great angle, whereby the air between the same, which is heated by the pipes 6 and thus has a tendency to rise, will be positively guided in a transverse direction to the left in Fig. 1, and in the same time, the baking plates between which the air returns in the opposite direction, can be set at a comparatively small inclination, so that the bread does not slide down. It would also be possible to fix the bread-supporting plates 9 in a horizontal position and only make the guiding plates 10 inclined. This modification is illustrated in Fig. 3 where the plates 9 rest on iron bars 17 running between the two side walls of the oven. If the baking chamber is also heated from the sides, special plates or flanges should be provided for protecting the bread from radiating heat from the sides. In the form shown, the bread is put in and taken out through a side door 15.

Having now particularly described the nature of my invention and the manner of its operation, what I claim is:

1. In baking ovens, a series of plates arranged one above the other in an inclined position in the baking chamber, and means for protecting the bread on said plates from radiating heat.

2. In baking ovens, a firing chamber, a baking chamber arranged above the same, a series of plates arranged one above the other in an inclined position in said baking chamber, and means for protecting the bread on said plates from radiating heat.

3. In baking ovens, a firing chamber, a baking chamber arranged above the same, a lower group of inclined plates in said baking chamber for guiding the air in transverse currents and protecting the bread from radiating heat from below, and an upper group of plates for supporting the bread.

4. In baking ovens, a series of plates arranged one above the other in the baking chamber and pivoted so as to be set in different inclined positions, and a handle outside the oven for swinging said plates.

5. In baking ovens, a firing chamber, a baking chamber arranged above the same, a lower group of plates pivoted on horizontal pins in said baking chamber and connected together by links, an upper group of plates pivoted and connected together in a corresponding way, a handle outside the oven for swinging one of the groups of plates, and means for connecting the two groups together in such way that the upper plates are swung through a smaller angle than the lower.

In testimony whereof I have signed my name to this specification in the presence of two subscribing witnesses.

CARL IVAR BOHLIN.

Witnesses:
DAVID SJALANDRY,
AXEL JOHANNSON.